United States Patent
Brown et al.

(10) Patent No.: US 8,023,519 B2
(45) Date of Patent: Sep. 20, 2011

(54) DENSE MODE CODING SCHEME

(75) Inventors: David A. Brown, Carp (CA); Peter B. Gillingham, Kanata (CA)

(73) Assignee: Mosaid Technologies, Inc., Ottawa, Ontario ( * ) Notice: Subject to any disclaimer, the term of this patent is extended or adjusted under 35 U.S.C. 154(b) by 0 days.

(21) Appl. No.: 12/612,443

(22) Filed: Nov. 4, 2009

(65) Prior Publication Data

US 2010/0049870 A1  Feb. 25, 2010

Related U.S. Application Data

(63) Continuation of application No. 11/969,521, filed on Jan. 4, 2008, now Pat. No. 7,633,960, which is a continuation of application No. 10/262,643, filed on Sep. 30, 2002, now Pat. No. 7,346,009.

(51) Int. Cl.
  *H04L 12/28* (2006.01)
(52) U.S. Cl. .......... 370/408; 370/256
(58) Field of Classification Search ............ None
  See application file for complete search history.

(56) References Cited

U.S. PATENT DOCUMENTS

| | | | |
|---|---|---|---|
| 6,266,706 B1 | 7/2001 | Brodnik et al. | |
| 6,430,527 B1 * | 8/2002 | Waters et al. | 703/3 |
| 6,553,002 B1 * | 4/2003 | Bremer et al. | 370/254 |
| 6,560,610 B1 * | 5/2003 | Eatherton et al. | 707/104.1 |
| 6,691,218 B2 | 2/2004 | Brown | |
| 6,778,532 B1 * | 8/2004 | Akahane et al. | 370/392 |
| 6,973,494 B2 | 12/2005 | Weisser et al. | |
| 6,985,960 B2 | 1/2006 | Takashima et al. | |
| 7,016,351 B1 | 3/2006 | Farinacci et al. | |
| 7,028,042 B2 * | 4/2006 | Rissanen | 707/101 |
| 7,106,732 B2 | 9/2006 | Brown | |
| 7,346,009 B2 * | 3/2008 | Brown et al. | 370/256 |
| 7,352,739 B1 | 4/2008 | Rangarajan et al. | |
| 2002/0174130 A1 * | 11/2002 | Wagner | 707/102 |
| 2003/0189930 A1 | 10/2003 | Terrell et al. | |

FOREIGN PATENT DOCUMENTS

WO  WO 99/14906 A1  3/1999

OTHER PUBLICATIONS

Gupta, et al., "Lookups in Hardware at Memory Access Speeds," IEEE, pp. 1240-1247, 1998.

Ruiz-Sanchez, Miguel,A., et al., "Survey and Taxonomy of IP Address Lookup Algorithms," IEEE Network, pp. 8-23, 2001.

(Continued)

*Primary Examiner* — Phirin Sam
(74) *Attorney, Agent, or Firm* — Chapin IP Law, LLC; Paul P. Kriz, Esq.

(57) ABSTRACT

A lookup table for searching for a longest prefix match for a key is disclosed. The lookup table provides a match for a key in a single search cycle. The number of matches stored in the lookup table is maximized by storing each match in only one location in the lookup table. The binary tree is divided into a plurality of levels and each level has a plurality of subtrees. A subtree descriptor stored for a subtree includes a field for each node in the subtree. The state of the field indicates whether an entry for the node is stored in the table. The bit vector allows indexing of the single match stored for the key.

25 Claims, 14 Drawing Sheets

OTHER PUBLICATIONS

Degermark, M., et al., "Small Forwarding Tables for Fast Routing Lookups," Department of Computer Science and Electrical Engineering, Lulea University of Technology, S-971 Lulea, Sweden, pp. 3-14.

P. Gupta, et al., "Routing Lookups in Hardware at Memory Access Speeds," IEEE, pp. 1240-1247, 1998.

Ruiz-Sanchez, Miguel, A., et al., "Survey and Taxonomy of IP Address Lookup Algorithms," IEEE Network, pp. 8-23, 2001.

* cited by examiner

| NODE | a | b | c | d | e | f | g | h | i | j | k | l | m | n | o |
|---|---|---|---|---|---|---|---|---|---|---|---|---|---|---|---|
| BIT VALUE | 1 | 0 | 1 | 1 | 0 | 0 | 0 | 0 | 0 | 0 | 1 | 1 | 0 | 0 | 0 |

FIG. 3B

DENSE MODE CODING SCHEME

RELATED APPLICATIONS

This Patent Application is a Continuation of U.S. patent application Ser. No. 11/969,521 filed on Jan. 4, 2008 now U.S. Pat. No. 7,633,960, entitled, "DENSE MODE CODING SCHEME," the contents and teachings of which are hereby incorporated by reference in their entirety. U.S. patent application Ser. No. 11/969,521 is a continuation of U.S. patent application Ser. No. 10/262,643 (U.S. Pat. No. 7,346,009) filed Sep. 30, 2002, entitled "DENSE MODE CODING SCHEME."

BACKGROUND OF THE INVENTION

The Internet is a set of networks connected by routers. A router maintains a routing table that indicates for each possible destination network, the next hop to which a received data packet should be forwarded. The next hop may be another router or the final destination.

An Internet Protocol ("IP") data packet received at a port in a router includes an IP destination address. The IP destination address is the final destination of the IP data packet. Currently there are two versions of IP, IP version 4 ("IPv4") and IP version 6 ("IPv6"). IPv4 provides a 32-bit field in an IP header included in the data packeted for storing the IP destination address. The router forwards a received data packet connected to a next-loop router, or the final destination if the destination is the local network, dependent on the IP destination address stored in the IP header.

A 32-bit IPv4 destination address provides 4 billion possible routes. An Internet router typically stores 50,000 of the 4 billion possible routes. However, the number of stored routes will increase with the growth of the Internet and the widespread use of IPv6.

Originally, the IP address space was divided into three classes of IP addresses; A, B and C. Each IP address space was divided into a network address and a host address. Class A allowed for 126 networks and 16 million hosts per network. Class B allowed for 16382 networks with 64,000 hosts per network and class C allowed for 2 million networks with 256 hosts per network. However, dividing the IP address space into different classes reduced the number of available IP addresses. Class C only allowed a maximum of 256 hosts per network which is too small for most organizations. Therefore, most organizations were assigned a Class B address, taking up 64,000 host addresses which could not be used by other organizations even if they were not used by the organization to which they were assigned. Hosts in an organization with a Class B IP address all store the same network address in the 16 Most Significant Bits ("MBSs"), for example, 128.32.xx.xx.

Classless InterDomain Routing ("CIDR") was introduced to free up unused IP host addresses. The remaining unused networks are allocated to organization in variable sized blocks. An organization requiring 500 addresses gets 500 continuous addresses. For example, an organization can be assigned 500 available addresses starting at 128.32.xx. The number of routes stored by a router has increased since the introduction of Classless InterDomain Routing. Classless InterDomain Routing requires longest prefix matching to find the corresponding route instead of searching for a matching network address in order to find the corresponding next hop for the IP destination address. For example, a search can no longer stop after the 16 MSBs of a Class B IP address, for example, 128.xx.xx because 128.32.4.xx may be assigned to another organization requiring a different next hop.

One method for searching for a longest prefix match for a key is through the use of a binary tree search. A binary tree search matches a 32-bit input bit by bit down to 32 levels, requiring 32 searches to find the entry matching the 32-bit key. Another method for searching for a match is through the use of a Patricia tree. A Patricia tree reduces the number of searches required if there are no entries down a leaf of the binary tree.

Yet another method for efficiently searching for a next hop associated with an IP destination address is described in PCT application Serial Number PCT/SE98/00854 entitled "Method and System for Fast Routing Lookups" by Brodnick et aL filed on May 11, 1998. The method described by Brodnick reduces the number of next hops stored by not storing duplicate routes. By reducing the number of next hops, the memory requirement is reduced so that a route lookup table can be stored in fast cache memory.

Brodnick et al. divides the binary tree into 3-levels. Dividing the binary tree into 3-levels reduces the number of searches to three. The indexed entry in the first level indicates whether the search can end at the first level with the route taken from the entry, or the search must continue to a subsequent level using a further portion of the IP destination address.

FIG. 1A illustrates a prior art 64K (65536) bit map representing the first level of a binary tree. A 64K bit map 30 represents the leaves or nodes 44 of the binary tree at depth 16, with one bit per node 44. The bit map is divided into bit-masks of length 16. There are $2^{12}$=4096 bit masks in the 64 k bit map. One bit mask is shown in FIG. 1A. A bit in the bit map 30 is set to '1' if there is a subtree or a route index stored in an array of pointers corresponding to the node 44. A bit in the bit map 30 is set to '0' if the node shares a route entry with a previous node 44.

A bit is set in the bit map 30 if the node does not share the route entry the previous node 44. Bit 4 is set '1' indicating that there is a subtree or route index corresponding to the node 44. Bit 5 is set '0' indicating that the node corresponding to bit 5 shares the subtree or route index with the node corresponding to bit 4. Bit 6 is set '1' indicating that the node corresponding to bit 6 does not share a subtree or route index with bits 4 and 5. Bit 6 corresponds to a node sharing the default route. Bits 6 and 12 set to '1' correspond to the default route.

FIG. 1B illustrates a prior art lookup table implemented in cache memory. The lookup table includes an array of code words 36, an array of base indices 34 and a map table 40. A 32-bit IP address 38 is also shown in FIG. 1B. A codeword 46 is stored in the array of code words 36 for each bit mask in the bit map 30 (FIG. 1A). The code word 46 includes a six-bit value 46a and a 10-bit offset 46b. A base index 42 is stored in the array of base indices 34 for every four code words 46 in the array of code words 36.

The array of code words 36, array of base indices 34 and map table 40 are used to select a pointer in an array of pointers (not shown). The pointer stores a route index or an index to perform a further search.

A group of pointers in the array of pointers is selected by selecting a code word 46 in the array of code words 36 and a base index 42 in the array of base indices 34. The code word 46 is selected using the first 12 bits 50 of the IP address 38. The base index 42 is selected using the first 10 bits 48 of the IP address 38. The correct pointer in the group of pointers is selected using the map table 32.

The 10-bit value 46b in the selected code word 36 is an index into the map table 32. The map table 32 maps bit numbers within a bit-mask to 4-bit offsets. The offset specifies the pointer within the selected group of pointers in the array of pointers. The 10-bit value 46b selects the row in the map table 32 and bits 19:16 of the IP address 52 selects the 4-bit offset 54.

An offset to specify a pointer is stored in the map table 32 for each '1' stored in the bit mask 30 (FIG. 1A). Thus, two separate location offsets to specify a default pointer corresponding to bits 6 and 12 in the bit mask 30 are stored in two separate locations in the map table 32. Storing multiple copies of the default pointer in the array of pointers reduces the number of route indexes that can be stored in a fixed size memory.

FIG. 2A illustrates a worst case encoded subtree which requires twice the number of entries in the array of pointers than actual routes. The routes r1-r8 are assigned to leaf nodes 215, 217, 219, 221, 223, 225, 227 and 229 as follows: r1 to leafnode 215; r2 to leaf node 217, r3 to leaf node 219; r4 to leaf node 221; r5 to leaf node 223; r6 to leaf node 225; r7 to leaf node 227 and r8 to leaf node 229. The default route r0 is assigned to all of the other leaf nodes 216, 218, 220, 222, 224, 226, 228 and 230.

FIG. 2B illustrates a prior art bit map 30 and associated pointers stored in an array of pointers 50 representative of the subtree shown in FIG. 2A. As described in conjunction with FIG. 1A, the bit map 30 includes one bit $242^1$-$242^{16}$ for each leaf node in the subtree. The array of pointers 50 stores a pointer for each bit set to '1' in the bit map 30. A bit is set '1' to indicate that the route corresponding to the leaf node differs from the route stored for the previous leaf node in the map table 32.

Sixteen entries are used to store the eight pointers to routes r1-r8 and the default route r0. The pointer to the default route r0 is stored in eight of the sixteen entries $252^{1-16}$.

A route corresponding to a node in the subtree is found by counting the number of '1's in the bit map and incrementing the pointer by the total number of ones. For example, the entry corresponding to node 224 (FIG. 2A) is stored in entry $252^{12}$. Storing the pointer to the default route in eight different entries decreases the available memory for storing pointers to routes.

SUMMARY OF THE INVENTION

A longest prefix match lookup table defining nodes of a tree searched for a route pointer corresponding to a prefix match is presented. The lookup table stores a binary tree representation of a key in a plurality of subtree levels. A portion of the bits of the key are searched in each subtree level.

Each subtree level includes a subtree memory and a mapper memory. The result of a search of each subtree level indicates whether a search must continue in a subtree in the next subtree level. The mapper memory stores pointers for nodes in a subtree. The subtree memory stores a subtree descriptor indexed by a subtree select from the previous subtree level. Instead of including a bit per node in the bottom level of the subtree, the subtree descriptor includes a bit for each node in the subtree. The bit corresponding to the node indicates whether a pointer for the node is stored in the mapper memory. By increasing the number of bits in the subtree descriptor, a pointer to a default route for the subtree shared by a plurality of nodes in the subtree is stored in a single entry in the mapper memory. Thus, the number of available locations for storing routes in the mapper memory is increased.

If the bit corresponding to a node in the subtree descriptor is set to '1', a pointer is stored for the node in mapper memory. The subtree descriptor includes a level descriptor for each level in the subtree. Each level descriptor includes a bit for each node in the level. Each subtree level also includes mapper address logic. The mapper address logic performs a parallel search in each level descriptor for a node matching a search key and computes an offset to the pointer corresponding to the matching node.

The subtree descriptor may also include a block pointer. The block pointer may store an index to the first pointer in the mapper memory for the subtree. The combination of the offset and the block pointer provides the index to the pointer corresponding to the matching node.

The default route is stored for a root node of the subtree. The default route stored may be an indication to use another default route for a parent subtree.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3B illustrates a bit map representation of the subtree shown in FIG. 3A according to the principles of the present invention;

DETAILED DESCRIPTION OF THE INVENTION

A description of preferred embodiments of the invention follows.

U.S. patent application Ser. No. 09/733,627 filed on Dec. 8, 2000 describes a method and apparatus for storing a route for an Internet Protocol ("IP") address in a multi-level lookup table, the contents of which are incorporated herein by reference. A multi-level search is performed to find a route index stored in a mapper in the lookup table which indexes a range of IP addresses corresponding to a range of leaves of a subtree.

Figure 3A:
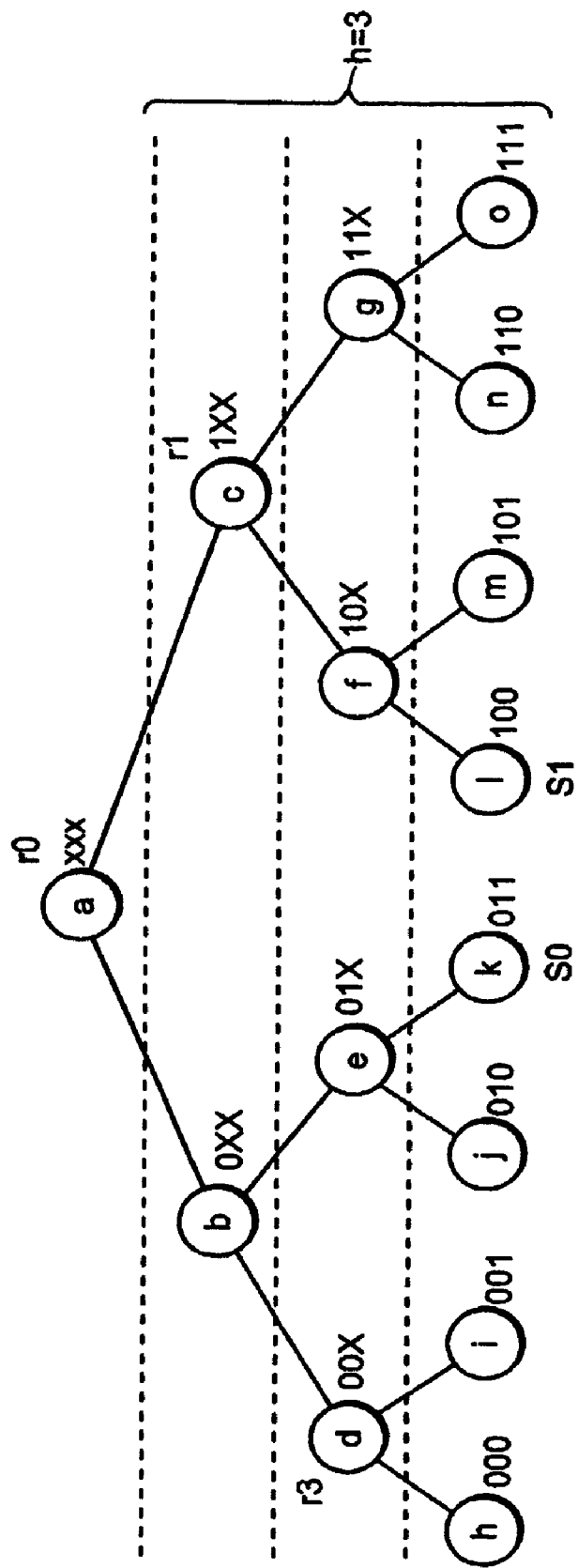
FIG. 3A is a four level subtree.

FIG. 3A is a four level subtree. The four level subtree has 15 ($2^{4+1}-1$) nodes with 3 route nodes r1, r2, r3 and 2 subtree entry nodes s0, s1. One node labeled 'a' is in level 1, two nodes labeled 'b' and 'c' are in level 2. Four nodes labeled 'd', 'e', 'f', 'g' are in level 3. Eight nodes labeled 'h', 'i', 'j', 'k', 'l', 'm', 'n', 'o', 'p' are in level 4.

FIG. 3B illustrates a bit map representation of the subtree shown in FIG. 3A according to the principles of the present invention. Each node in the subtree shown in FIG. 3A is assigned a label. Each node has a corresponding bit position in the bit map. For each route node and subtree entry node in the subtree, the corresponding bits in the bit map are set to '1'. Thus, bit 350 corresponding to node a, the root node of the subtree is set to '1', bit 352 corresponding to route r1 (node c) is '1', bit 354 corresponding to route r3 (node d) is '1', bit 356 corresponding to subtree entry s0 is '1' and bit 358 corresponding to subtree entry s1 is '1'.

Figure 1A:
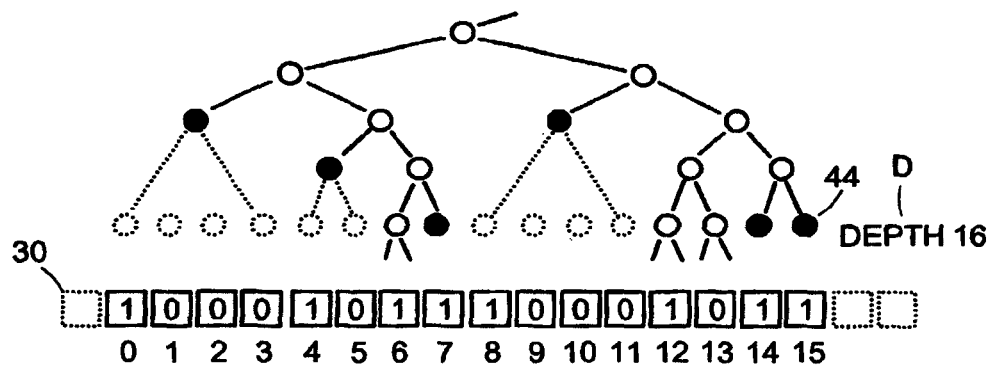
FIG. 1A illustrates a prior art bit map for representing the first level of a binary tree.
Figure 1B:
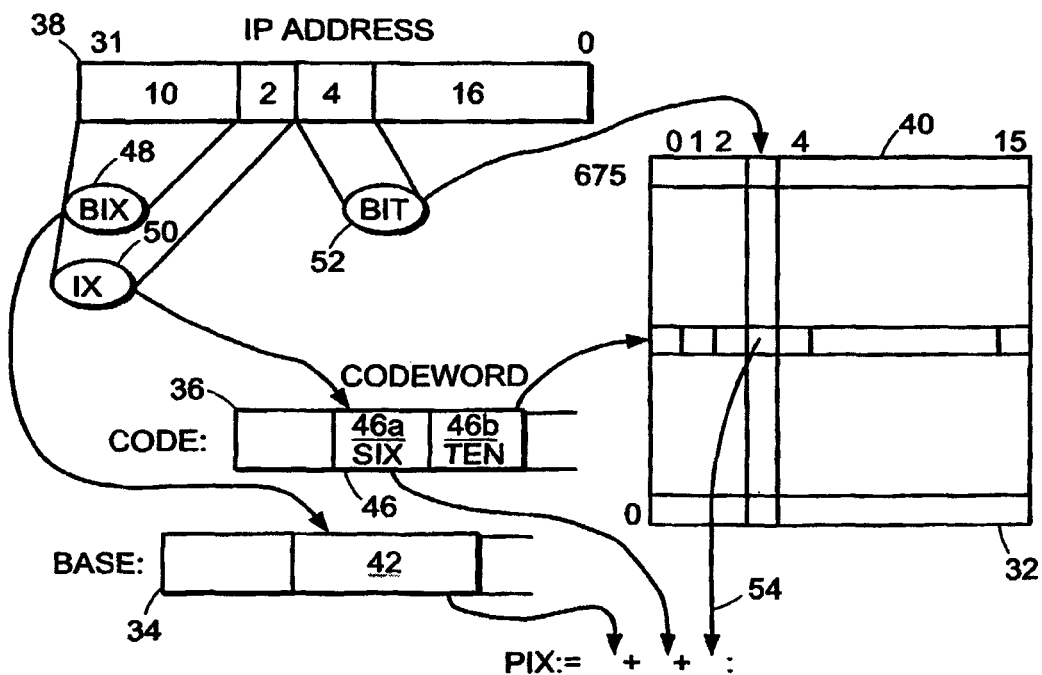
FIG. 1B illustrates a prior art lookup table implemented in cache memory.
Figure 2A:
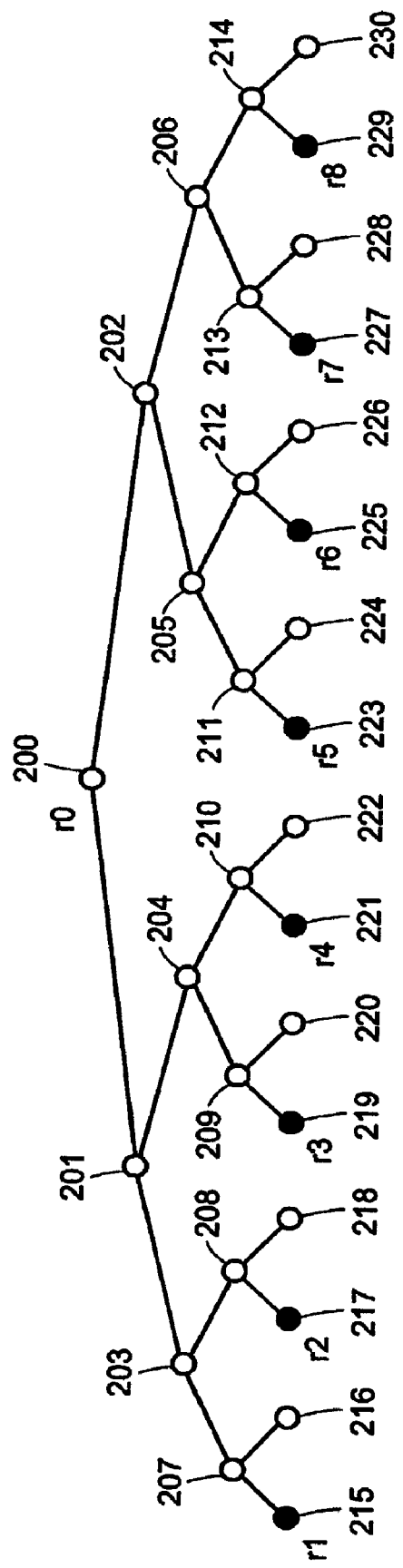
FIG. 2A illustrates a worst case encoded subtree which requires twice the number of map table entries than actual routes.
Figure 2B:
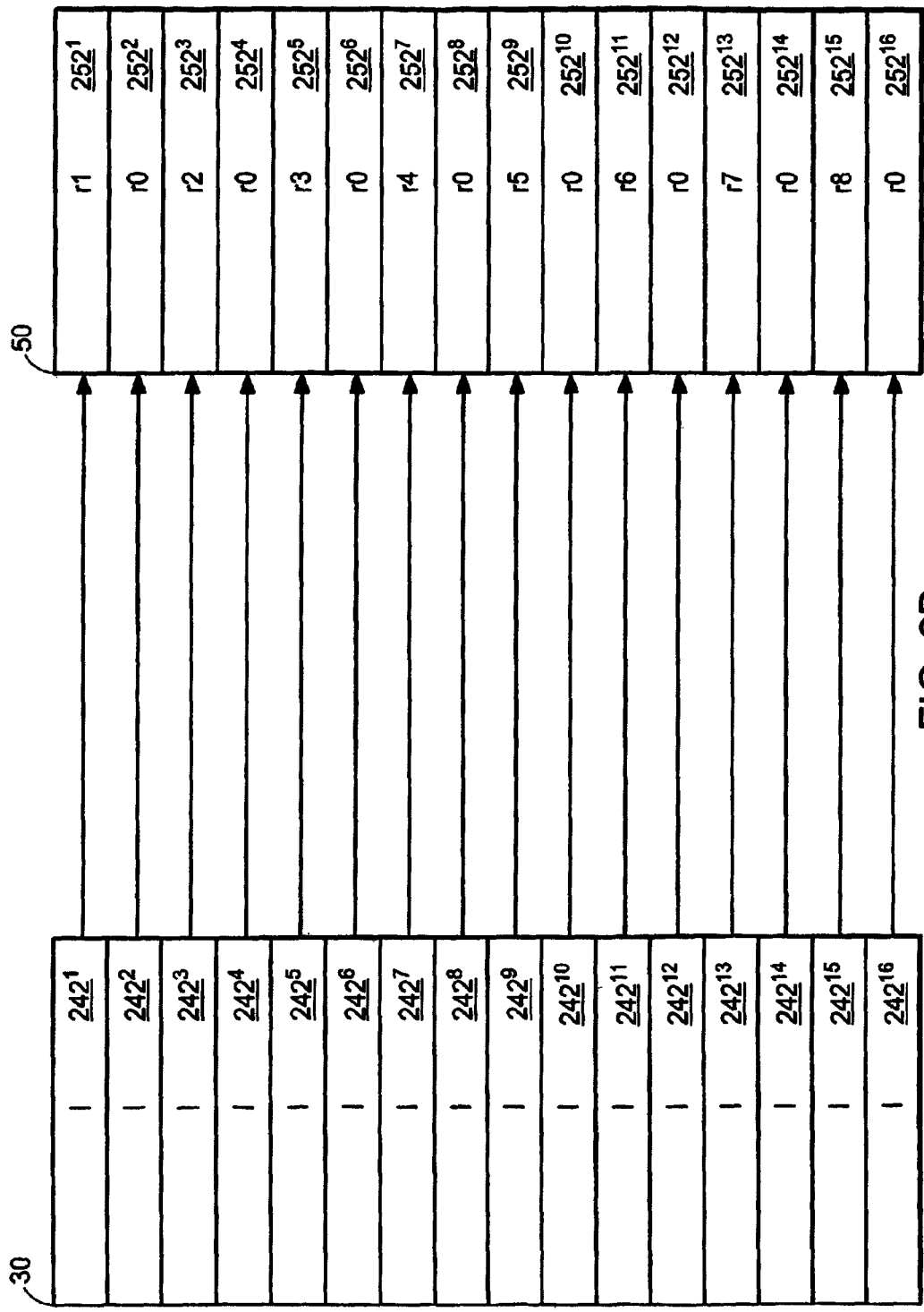
FIG. 2B illustrates a prior art bit map representation of the subtree shown in FIG. 2A and associated pointers stored in the map table.

Thus, the bit map includes a bit for each node in the subtree instead of only leaf nodes as in the prior art coding scheme described in conjunction with FIGS. 2A and 2B.

Figure 3C:
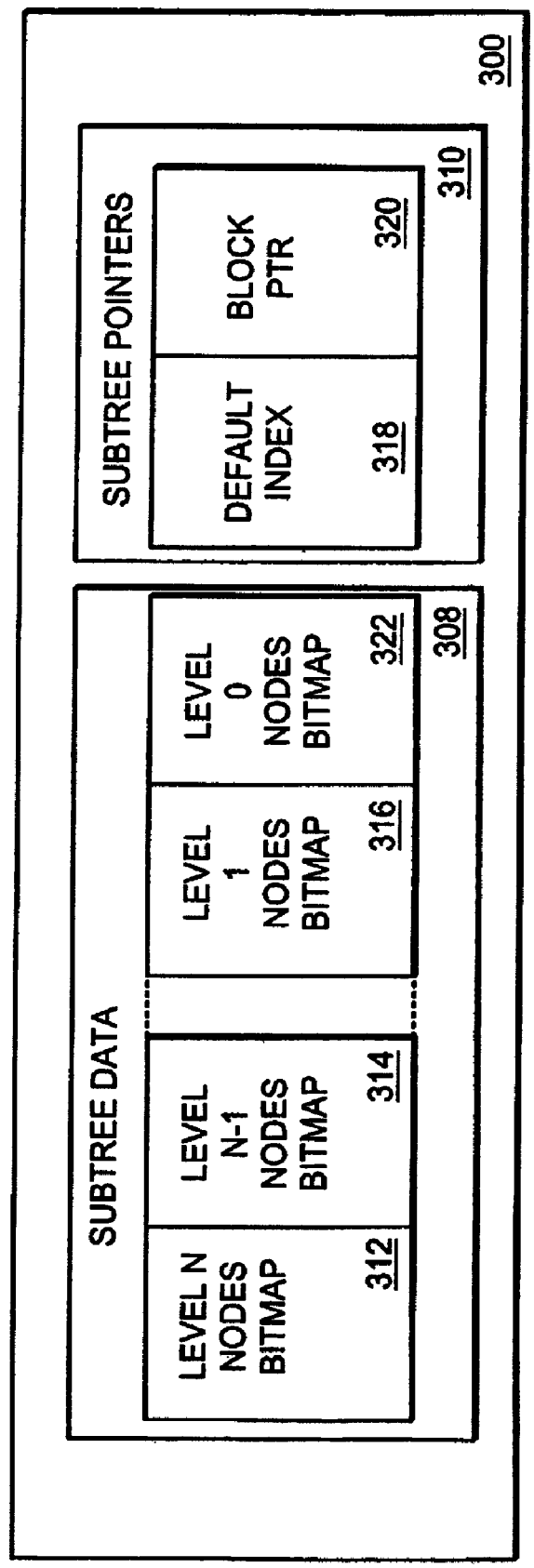
FIG. 3C is a block diagram of a subtree descriptor and associated routes for the subtree shown in FIG. 2A according to the principles of the present invention.

A bit map for a subtree of h=3 has 15 ($2^{4+1}-1$) instead of 8 bits $2^3$ for a bit map which has a bit per leaf node. FIG. 3C is a block diagram of a subtree descriptor 300 and associated routes for the subtree shown in FIG. 2A. The subtree descriptor 300 includes subtree data 308 and subtree pointers 310. The subtree data 308 includes a bit for each node in the subtree. The subtree pointers 310 include a block pointer 320 for storing a pointer to a block of mapper entries in a memory allocated for storing routes for the subtree. By including a bit for each node in the subtree data 308 instead of just leaf nodes, a pointer to a default route, shared by a plurality of nodes in the subtree, is stored in one location for all nodes in the subtree. The pointer to the default route is stored in a mapper entry corresponding to the root of the subtree. The small increase in the size of the subtree data 308 due to the longer bit map decreases the number of mapper entries for storing the default route to one per subtree. Thus, the number of routes that can be stored is increased. By eliminating the duplicate storage of pointers to the default route, the same number of routes stored in the prior art map table described in conjunction with FIG. 2B can be stored in a smaller memory.

The subtree data 308 includes a bit for each node in the subtree. A bit for each node in the bottom level of the N-level subtree; that is, the leaf nodes is provided in level N nodes bitmap 312. A bit for each node in the level above the bottom level (N-1) is provided in level N-1 nodes bitmap 314 and a bit for the root of the subtree is provided in the level 1 node bitmap 316.

The subtree pointers field 310 includes a default index 318 for storing the default route for the subtree and a block pointer 320 for storing a pointer to the start of a block of mapper entries allocated for storing routes for the subtree. The default index 318 is described in co-pending U.S. application Ser. No. 10/004,280 filed on Oct. 31, 2001 entitled "Default Route Coding," by David A. Brown, the contents of which are incorporated herein by reference.

Figure 4:
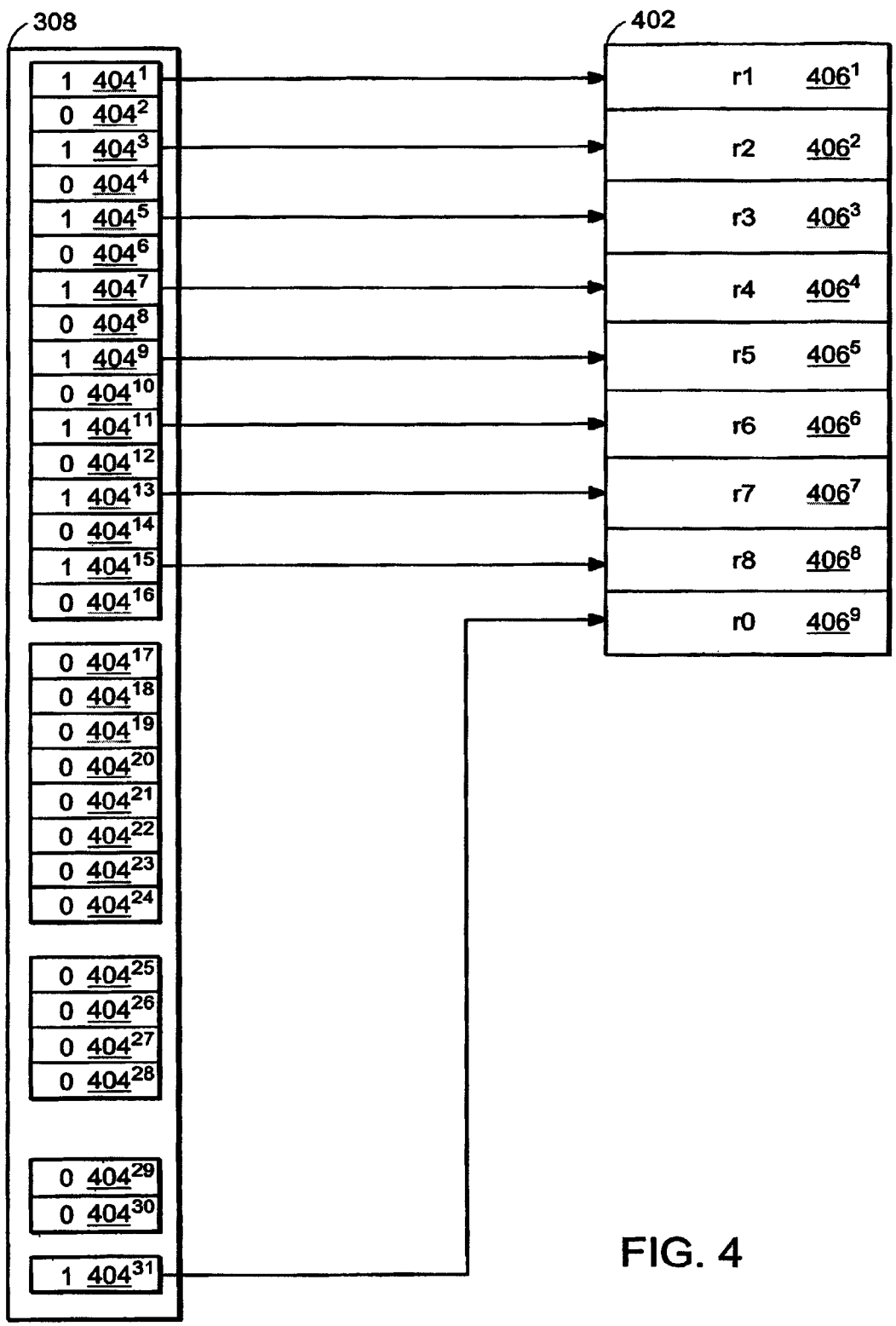
FIG. 4 is a block diagram of a bit map representation of the subtree shown in FIG. 2A stored in the subtree data shown in FIG. 3C.

FIG. 4 is a block diagram of a bit map representation of the subtree shown in FIG. 2A stored in the subtree data 308 shown in FIG. 3C. The subtree data 308 in the subtree descriptor is expanded to include a bit 404 for each node 200-230 in the subtree shown in FIG. 2A instead of only the leaf nodes as shown in the prior art coding scheme (FIG. 2B). The number of bits in the subtree data 308 is $2^{h+1}-1$ where h is the height of the subtree. For example, a subtree of height 8 requires 511 bits ($2^9-1$) in the subtree data to represent the subtree. The subtree data 308 is described in conjunction with FIG. 2A.

As shown in FIG. 2A, the height (h) of the subtree is 4. Thus, the number of nodes is 31 ($2^{h+1}-1$ where h=4). Bits $404^{27}$-$404^{16}$ correspond to leaf nodes 215-230 (FIG. 2A) in the bottom level of the subtree, and to the level N (where N=h+1=5) nodes bit map 312 (FIG. 3C). Bits $404^{17}$-$404^{24}$ correspond to nodes 207-214 in the next level of the subtree, and to the level N-1 (where N-1=h=4) nodes bitmap 314 (FIG. 3C). Bits $404^{25}$-$404^{28}$ correspond to nodes 203-206 in level 3 of the subtree, bits $404^{29}$-$404^{30}$ correspond to nodes 201, 202 in level 2 of the subtree and bit $404^{31}$ corresponds to node 200 at the root of the tree (the default route for the subtree) and the level 1 node bitmap 316 (FIG. 3C).

As shown, a pointer to each route r1-r8 in the subtree shown in FIG. 2A is stored in a respective mapper entry $406^1$-$406^8$ in mapper memory 402. Mapper entry $406^1$ stores a pointer to r1 for leaf node 215 in the subtree. Mapper entry $406^2$ stores a pointer to route r2 for leaf node 217 in the subtree. Mapper entry $406^3$ stores a pointer to route r3 for leaf node 219 represented by bit $404^5$ in the subtree data 308. Mapper entry $406^4$ stores a pointer to route r4 for leaf node 221 represented by bit $404^7$ in the subtree data 308. Mapper entry $406^5$ stores a pointer to route r5 for leaf node 223 represented by bit $404^9$ in the subtree data 308. Mapper entries $406^6$, $406^7$ and $406^8$ store a pointer to routes for respective leaf nodes 225, 227 and 229. All of the other nodes in the subtree map to the default route r0. The default route r0 is stored once in mapper entry $406^9$ for the root of the subtree represented by bit $404^{31}$ in the subtree data 308 and for all nodes mapping to the default route.

Returning to FIG. 2A, the prior art subtree encoded using only leaf nodes requires 16 mapper entries 252. Continuing with FIG. 4, by storing the default route r0 for the subtree in only one mapper entry, the number of mapper entries used is reduced from 16 to 9 for the same four level subtree with 16 leaf nodes and eight routes shown in FIG. 2A. Thus, by not duplicating default routes stored in mapper memory, the available memory for storing routes is increased. In the example shown, seven mapper entries which would have been used to store the default route in the prior art (FIG. 2B) can be used for storing routes. The increase in the number of bits in the subtree descriptor is offset by the corresponding reduction in the number of mapper entries 306 used per subtree, to store the same number of routes stored in the prior art lookup table.

In one embodiment, the default route is stored in the default index 318 to facilitate updating the default route and allow the default route to be inherited from a parent subtree. An inherit indicator is stored in the default index 318 instead of the default route, to indicate that the default route corresponding to the root of the subtree is inherited from a parent subtree. A use default indicator is stored in mapper entry $406^9$ instead of the default route itself. Upon detecting the use default indicator stored in the mapper entry, the pointer to the default route stored in the default index or the inherited default route pointer is returned as the result of the search of the lookup table.

Figure 5:
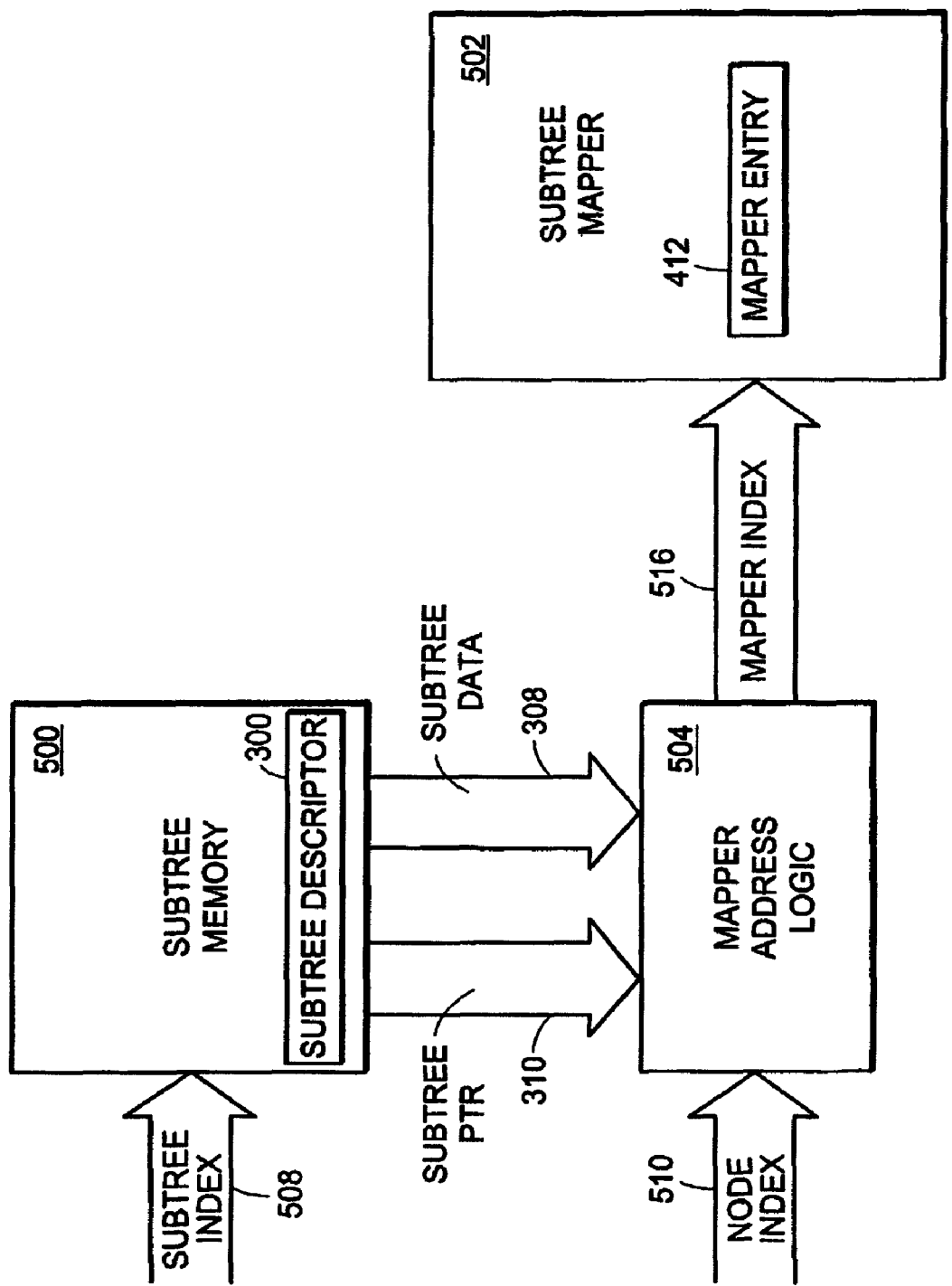
FIG. 5 illustrates a subtree mapper storing a mapper entry corresponding to a leaf node in a subtree and a subtree memory storing a subtree descriptor for the subtree.

FIG. 5 illustrates a subtree mapper 502 storing a mapper entry 412 for a node in a subtree and a subtree memory 500 storing a subtree descriptor 300 for the subtree. A subtree index 508 forwarded from a mapper entry of a previous level selects the subtree descriptor 300 stored in the subtree memory 500 for the subtree. Mapper address logic 504 selects the mapper index 516 for the node dependent on the selected subtree descriptor 300 and the node index 510.

The node index 510 for a subtree of height N has N bits, for example, the node index 510 for a subtree of height 3 has 3 bits. The three bits identify the leaf node (i.e., the node at the bottom of the subtree) and all parent nodes up to the root of the subtree.

Returning to FIG. 3A a node index='000' identifies mapper entries for node 'h' and parent node 'd' and 'b' and root node 'a'. A search for a longest match begins with the leaf node 'h' identified by the node index 510.

The subtree descriptor 300 includes subtree data 308 (FIG. 3C) and subtree pointers 310 (FIG. 3C). The subtree data field 308 has one bit for each node in the subtree as described in conjunction with FIG. 3C. The subtree descriptor 300 also includes a pointers field 310 to allow for the storage of pointers to mapper entries in the subtree mapper 502 to provide access to the 256 mapper entries 412 that can be stored for an eight level subtree.

The subtree data 308 stored in the subtree descriptor 300 is forwarded to the mapper address logic 504. The mapper address logic 504 also receives a node index 510. The mapper address logic 504 determines the mapper index 516 to the mapper entry 412 corresponding to the node in the subtree dependent on the node index 510, the subtree data 308 and the subtree pointers 310 in the subtree descriptor 300 for the subtree. The mapper index 516 selects the mapper entry 412 for the node in the subtree.

Figure 6:
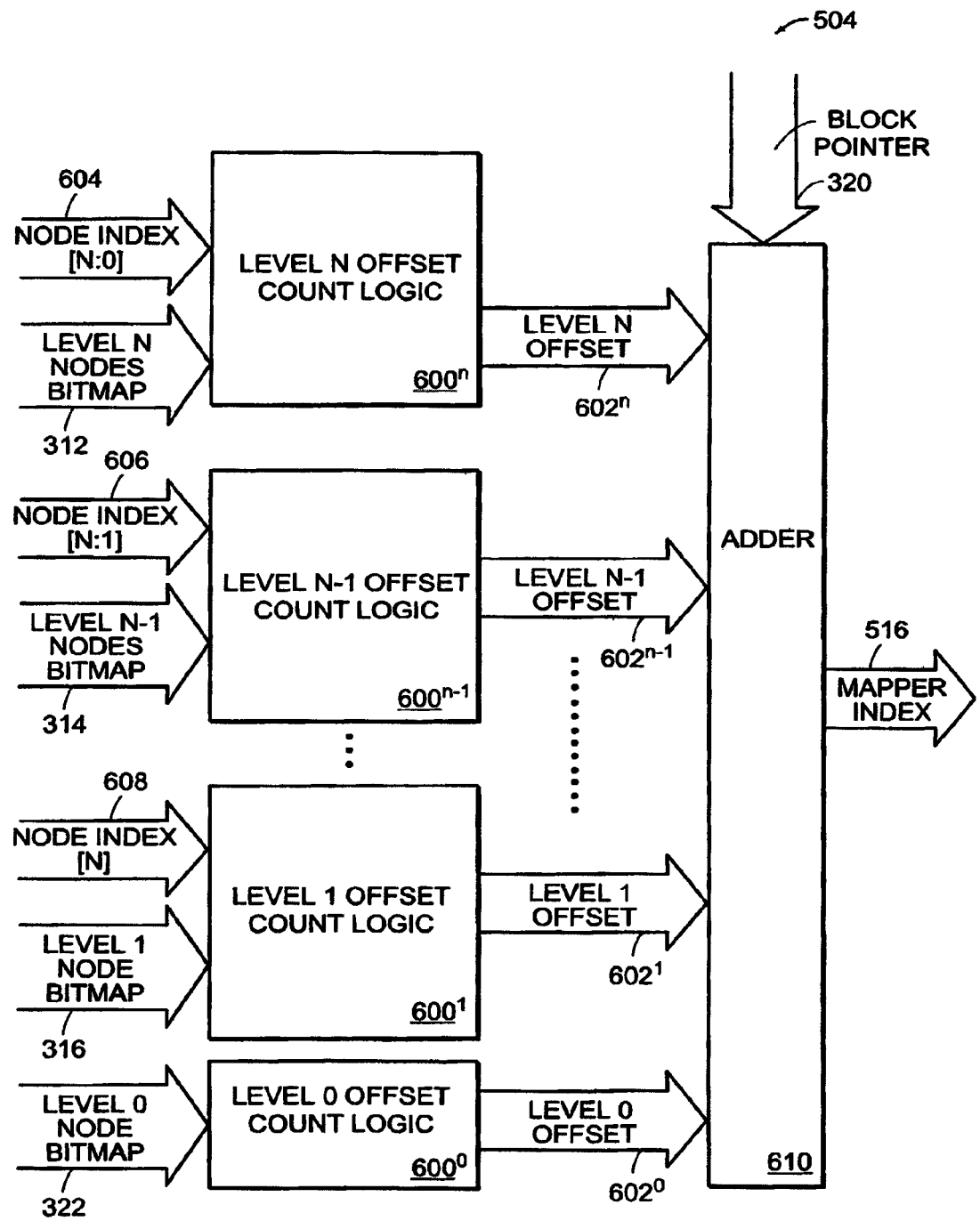
FIG. 6 illustrates an embodiment of the mapper address logic for computing the mapper index to a mapper entry corresponding to a leaf node in the subtree.

FIG. 6 illustrates an embodiment of the mapper address logic 504 for computing the mapper index 516 for a mapper entry 412 (FIG. 5) corresponding to a node index 510 in the subtree. The mapper address logic 504 includes offset count logic $600^0$-$600^n$ for each level in the subtree, where n=h+1, h being the height of the subtree. The offset count logic 600 counts the number of mapper entries lower than the selected node based on the number of bits set to '1' in the subtree data 308 (FIG. 3) in the subtree descriptor 300 (FIG. 3C).

The total number of mapper entries lower than the mapper entry for the selected node is computed by summing the offsets $602^1$-$602^n$ output by the offset count logic $600^1$-$600^n$ for each level. The mapper index 516 is computed in the adder 610 by adding the pointer offsets to the block pointer 320 (FIG. 3C) stored in the subtree descriptor 300.

Figure 7:
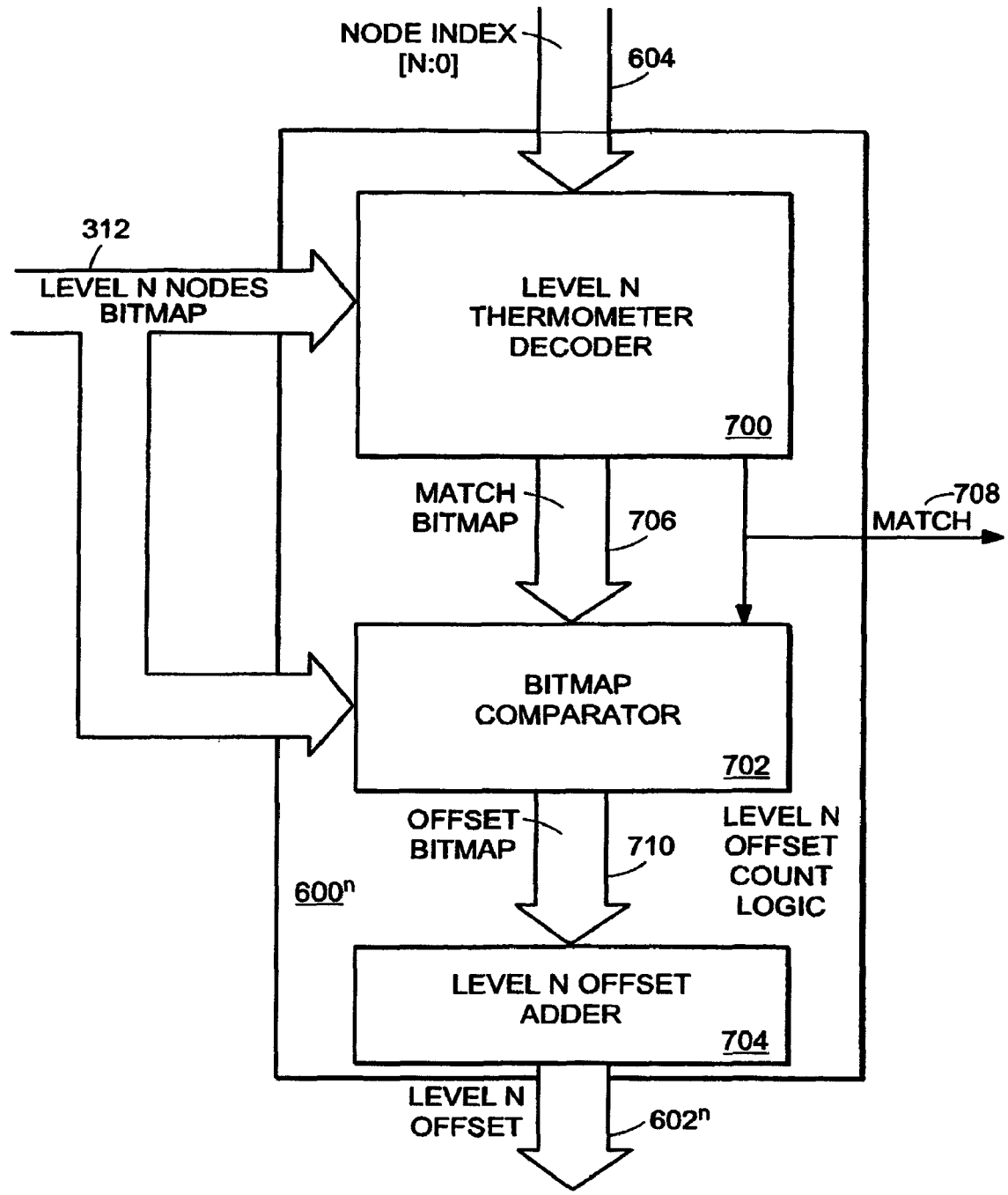
FIG. 7 is a block diagram illustrating an embodiment of the level N offset count logic shown in FIG. 6.

FIG. 7 is a block diagram illustrating an embodiment of the level N offset count logic $600^n$ shown in FIG. 6. As described in conjunction with FIG. 6, the level N offset count logic $600^n$ computes the offset from the block pointer 320 (FIG. 3C) to the node selected by the node index 604. The offset is the number of mapper entries stored in mapper memory for the subtree between the mapper entry for the selected node and the block pointer 320 (FIG. 3C) for the subtree.

The level N offset logic $600^n$ includes a level N thermometer decoder 700, a bitmap comparator 702 and a level N offset adder 704. If there is a mapper entry stored for the level N node, the level N thermometer decoder 700 selects all nodes lower than the leaf node index 604. A match N signal 708 is set to '0'. The match N signal is coupled to the bitmap comparator 702 in the level N-1 offset count logic $600^{n-1}$. The match N signal 708 set to '0' disables the output of offset count logic 600 of lower levels. If there is no mapper entry stored for the level N node, all of the bits in the match bit map 706 are forced high. The match N signal 708 is set to '1' to enable the output of offset count logic 600 of lower levels.

The bitmap comparator 702 compares each bit in the match bit map 706 with the respective bit in the level N nodes bitmap 312 stored in the subtree descriptor 300. The result of the comparison is output as the offset bitmap 710. The offset bitmap 710 indicates all mapper entries 406 that are stored in mapper memory 402 up to the selected node for the subtree.

The level N offset adder 704 counts the number of '1's in the offset bit map 710. The total number of '1's is the level N offset $602^n$ of the mapper entry for the node from the block pointer 320.

Figure 8:
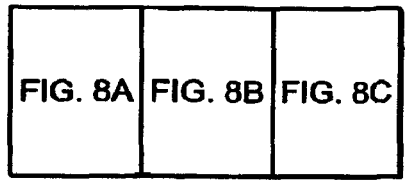
FIG. 8 is a circuit diagram of the embodiment of the mapper address logic described in conjunction with FIG. 6 and FIG. 7 for a subtree with seven levels.
Figure 8A:
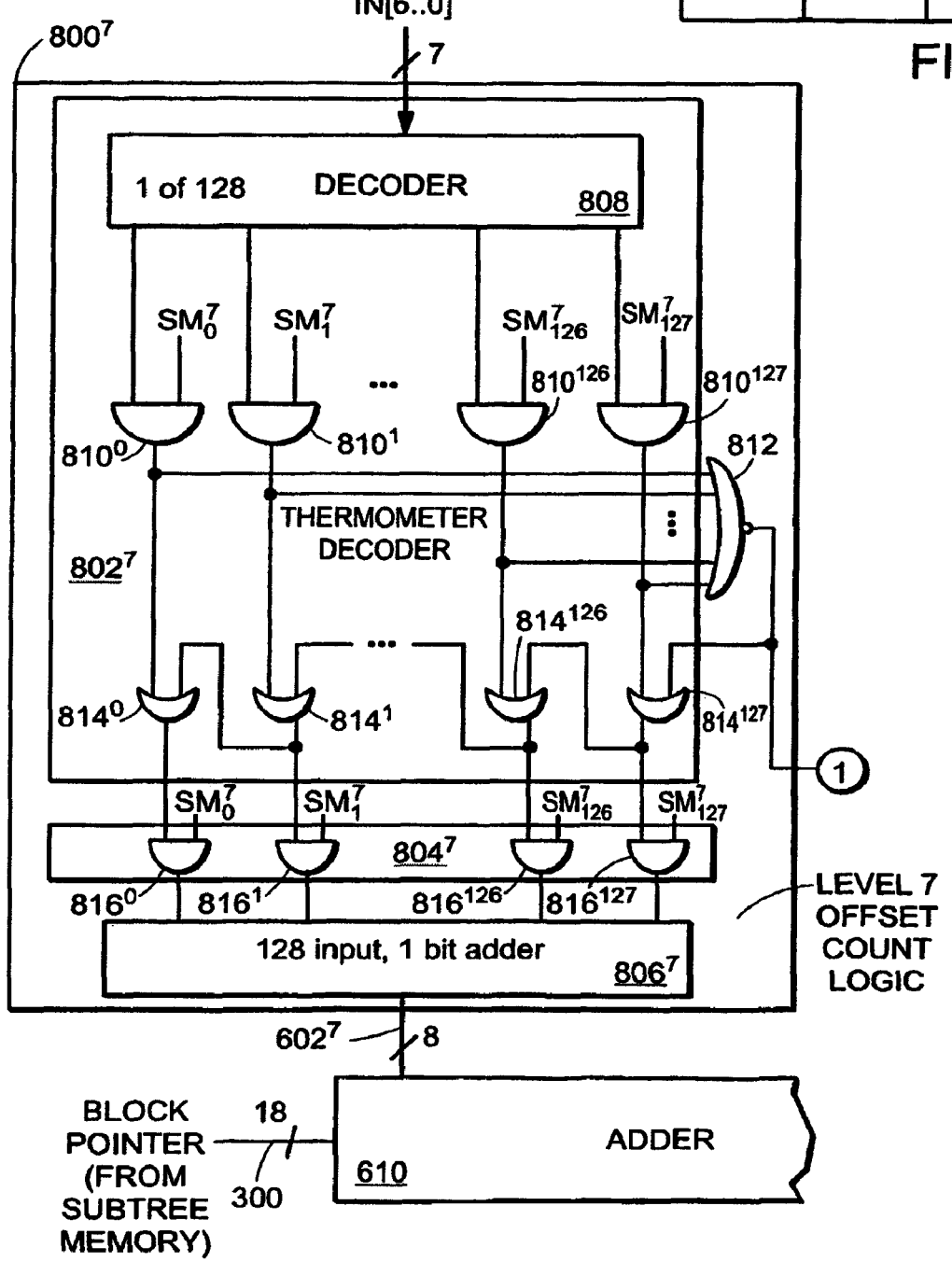
Figure 8B:
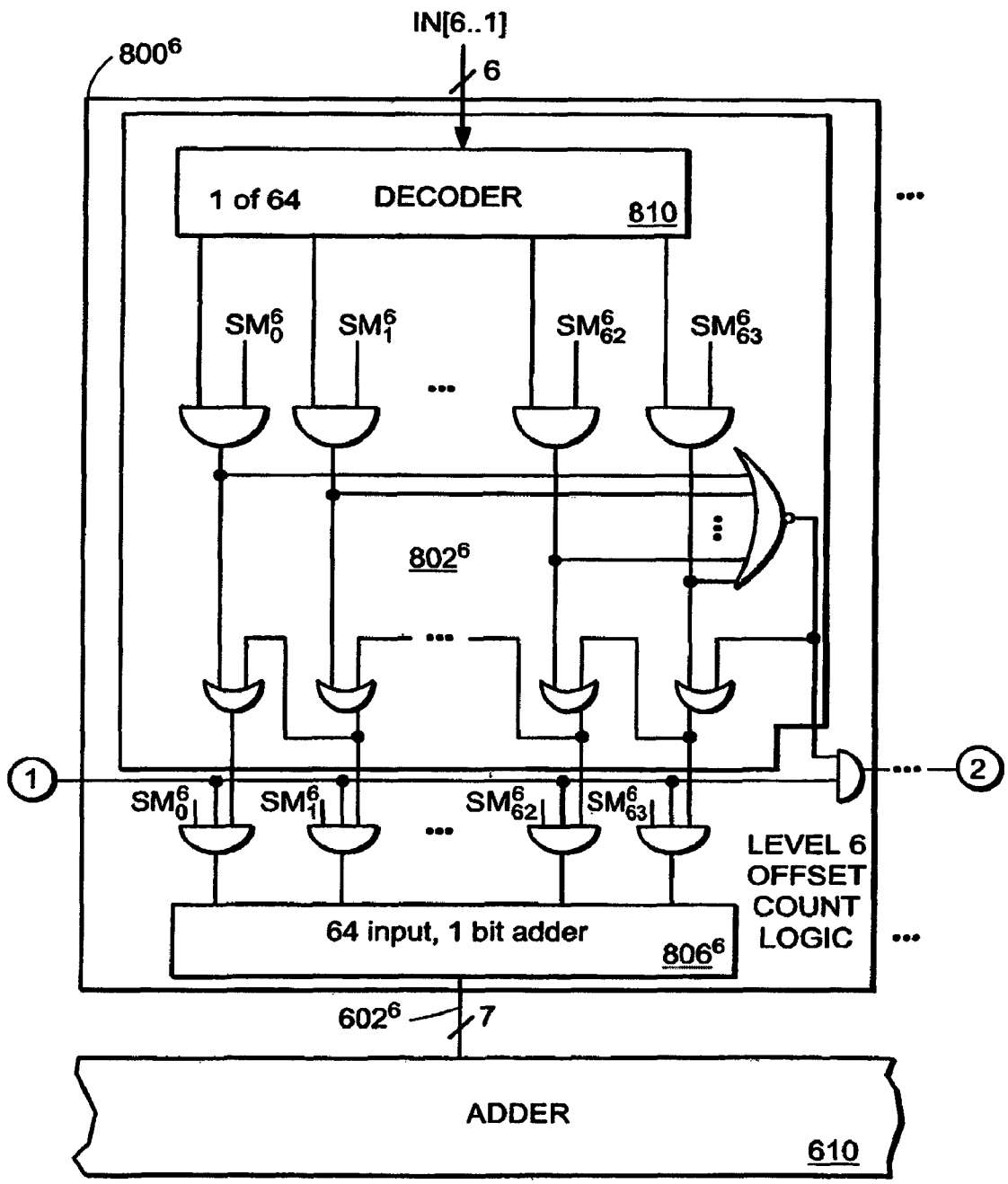
Figure 8C:
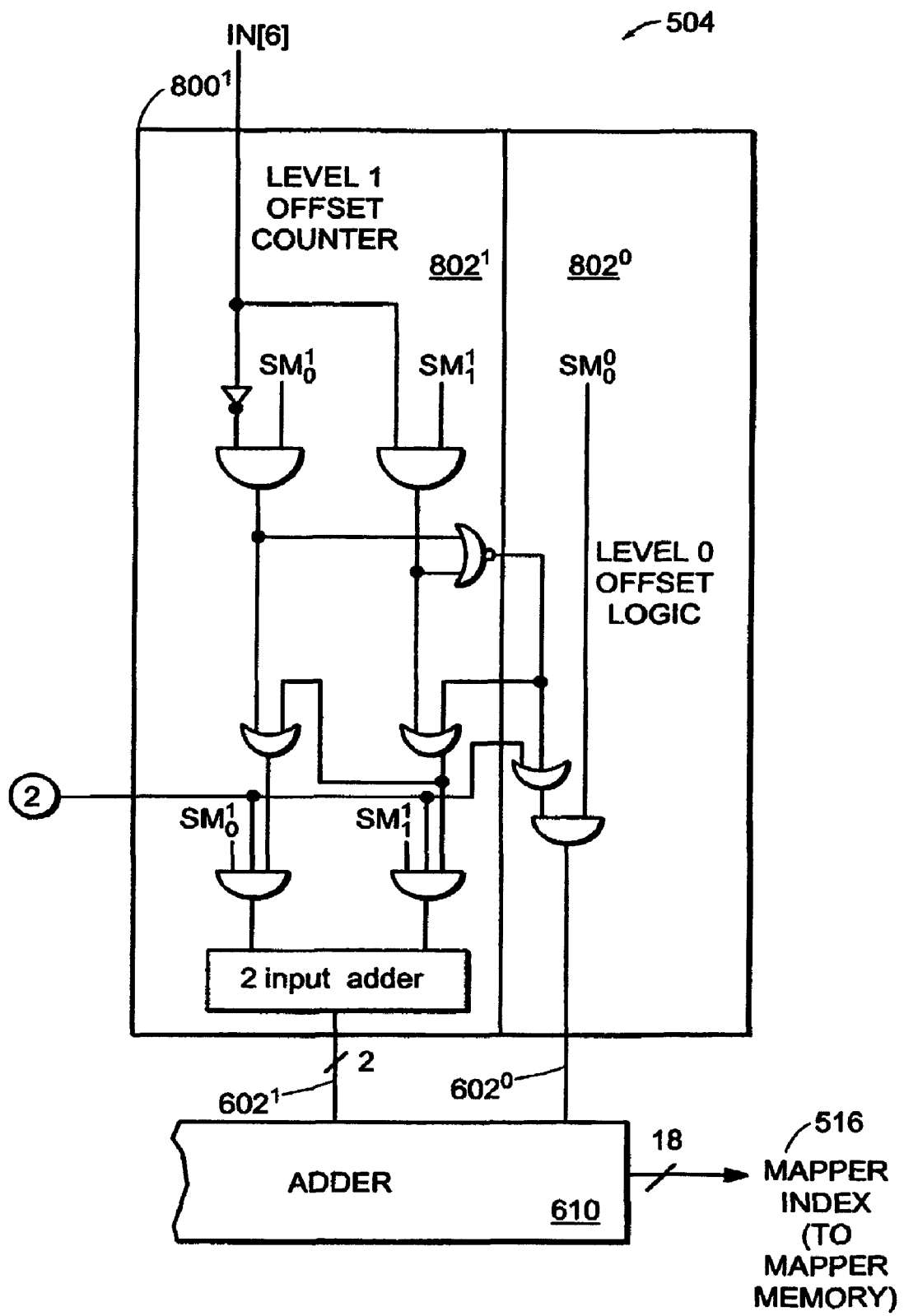

FIG. 8 is a circuit diagram of the embodiment of the mapper address logic 504 described in conjunction with FIG. 6 and FIG. 7 for a subtree with h=7 and a total of 255 ($2^8$-1) nodes. The subtree has eight levels 0-7, and corresponds to 7-bits [6:0] subtree. Offset count logic $800^7$ corresponds to level N offset count logic $600^n$ n=7. The mapper address logic 504 includes level 7 offset count logic $800^7$, level 6 offset count logic $800^6$ and level 1 offset counter $800^1$ and level 0 offset logic $800^0$. Level 7 offset count logic $800^7$ includes a level 7 thermometer decoder $802^7$, $2^7$(128) bit map comparator $804^7$ and level 7 offset adder $806^7$ as described in conjunction with FIG. 7.

The level 7 thermometer decoder $802^7$ corresponds to the level N thermometer decoder for level N, where N=7 which was described in conjunction with FIG. 7. The $2^7$(128) bitmap comparator $804^7$ corresponds to the bitmap comparator for level N, where N=7, described in conjunction with FIG. 7. The level 7 offset adder corresponds to the level N offset adder where N=7 described in conjunction with FIG. 7.

Level 7 of the subtree has 128 ($2^7$) nodes. The thermometer decoder $802^7$ includes a 1 of 128 decoder 808, a plurality of AND-gates, one for each of the 128 outputs of the 1 of 128 decoder 808, a NOR gate 812 and a plurality of OR gates, one for each output of the plurality of AND-gates. The bit map comparator $804^7$ includes a plurality of AND gates, one for each bit in the level 7 nodes bit map. The operation of the mapper address logic 504 is explained using a numerical example. The bit map (for the most significant 21 bits of the 128 bitmap) stored in subtree data 308 (FIG. 3C) in the subtree descriptor 300 (FIG. 3C) are shown in Table 1 below:

TABLE 1

| Bit Map | Value (Bit 0:Bit 20) |
|---|---|
| $SM^7_0$-$SM^7_{20}$ | 110101011101010110111 |
| 1 of 128 decoder | 000000000000000010000 |
| (First set of AND-gate outputs ($810^0$-$810^{20}$)) | 000000000000000010000 |
| Match Bit Map | 111111111111111110000 |
| (OR - gate outputs ($814^0$-$814^{20}$)) | |
| Offset Bit Map | 110101011101010110000 |
| (Second set of AND gate outputs ($816^0$-$816^{20}$)) | |

The node index [6:0] is '001000' indicating a search for the route corresponding to the 17$^{th}$ node in the seventh level of the subtree. The level 7 nodes bit map $SM^7_0$-$SM^7_{127}$ for the first 21 nodes in the seventh level of the subtree is shown in Table 1. The bit map $SM^7_0$-$SM^7_{127}$ is stored in the level N (N=7) nodes bit map 312 (FIG. 3C) in the subtree data 308 (FIG. 3) in the subtree descriptor 300 (FIG. 3C). The $SM^7_{16}$ bit is '1' indicating that a mapper entry is stored for the node in mapper memory. The bitmap output from the 1 of 128 decoder 808 based on the leaf node index [6:0] set to '001 0000' has bit $SM^7_{16}$ set to '1' and all other bits set to '0' as shown in Table 1. Thus, all bits output from the "1 of 128 decoder" 808 are set to '0' except the $S_{M0}{}^{16}$ bit which is set to '1' indicating the selected node.

Each output from the 1 of 128 decoder 808 is compared with a respective bit of the level 7 nodes bitmap $SM^7_0$-$SM^7_{127}$ to determine if there is a mapper entry for the 17$^{th}$ node; that is, if there is a mapper entry for the 17$^{th}$ node in the 7$^{th}$ level of the subtree. As shown in Table 1, only bit 16 of the bit map output from the plurality of the AND gates $810^0$-$810^{127}$ is set to '1' indicating that there is a mapper entry for the $17^{th}$ node. Each of the AND gate outputs is coupled to a respective input of NOR gate 812. If any of the inputs to NOR gate 812 is set to '1', the output of NOR gate 812 is set to '0', indicating that there is a mapper entry corresponding to a node in the $7^{th}$ level. If the output of NOR gate 812 is set to '0', a further search for a match in the level 6 nodes or nodes in any other upper levels of the subtree is not necessary because a node in the $7^{th}$ level is selected according to the longest match requirement when there are multiple matches in the subtree.

As shown, there is a mapper entry for the $17^{th}$ node in level 7 of the subtree, thus the output of the NOR gate 812 is set to '0'. The output of NOR gate 812 (match N 708 (FIG. 7) is coupled to level 6 offset logic $800^6$ and also coupled to one input of each of the plurality of 2-input OR gates $814^0$-$814^2$.

The 2-input OR gates select all bits in the level 7 nodes bitmap $SM^7_0$-$SM^7_{127}$ that are lower than or equal to the selected node ($17^{th}$ node) selected by the 1 of 128 decoder 808. The match bit map 706 (FIG. 7) output from the OR gates $814^0$-$814^{127}$ is shown in Table 1. Bits 0:16 are set to '1' and all other bits are set to '0'.

The bitmap comparator 702 includes a plurality of 2-input AND-gates $816^0$-$816^{127}$, one for each bit in the match bit map 706. Each AND gate $816^0$-$816^{127}$ compares one bit of the match bit map 706 with a respective bit of the level 7 nodes bitmap $S_{M0}^7$-$S_{M127}^7$ 312 (FIG. 7). The result of the comparison provides the number of mapper entries stored in mapper memory up to and including the $17^{th}$ node in level 7 of the subtree. The bits of node bit map $SM^7_0$-$SM^7_{127}$ are ANDed with respective bits of match bit map. The bitmap output (offset bit map) 710 (FIG. 7) of the AND gates is shown in Table 1. The 128 bit, 1 bit adder $806^7$ counts the number of '1's in the offset bit map 710 output from the AND gates $816^0$-$816^{127}$. The total number of bits set to '1' is 11. Thus, an offset of 11 is added to the block pointer 320 (FIG. 6) to provide the mapper index 516 (FIG. 6) to the mapper entry for the $17^{th}$ node in level 7 of the subtree in mapper memory.

The speed of the mapper address logic 504 can be improved using other components such as look ahead adders, parallel versus serial logic and adder pre-decoders to reduce propagation delay. These techniques are well-known to those skilled in the art.

Figure 9:
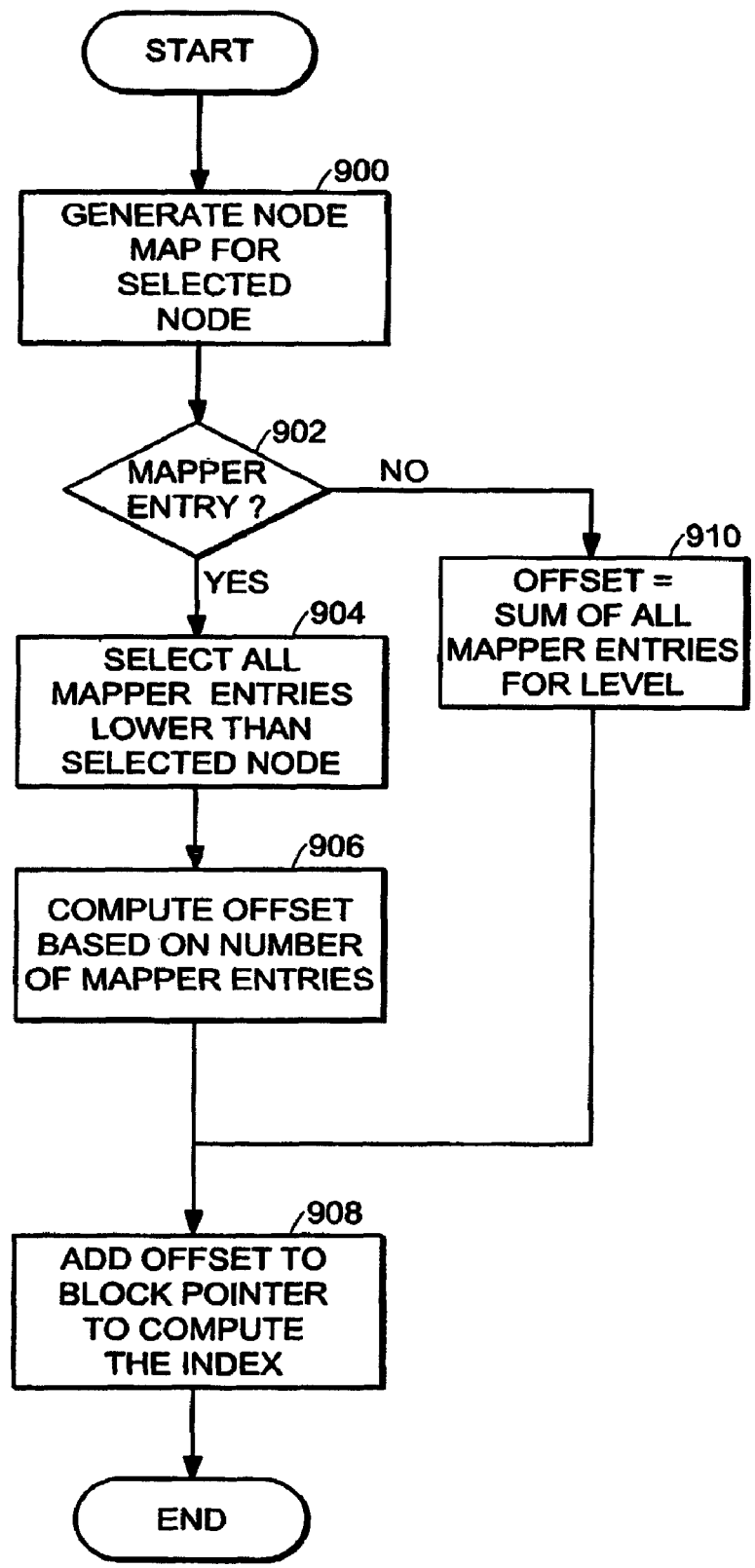
FIG. 9 is a flowchart illustrating a method for computing the mapper index implemented in the mapper address logic shown in FIG. 8.

FIG. 9 is a flowchart illustrating a method for computing the mapper index implemented in the mapper address logic 504 shown in FIG. 8. FIG. 9 is described in conjunction with FIG. 8.

At step 900, each decoder 808, 810 in each respective offset count logic (FIG. 8) generates a node map in parallel for the selected node. The bit in the node map corresponding to the selected node is set '1', all other bits are set '0'. Processing continues with step 902.

At step 902, the node map output by the decoder is compared with the node bit map for the respective level. If any of the resulting bits are '1', there is a mapper entry for the node and processing continues with step 904. If not, processing continues with step 910 to compute the number of mapper entries used by the level.

At step 904, all mapper entries lower than the selected node in the level are selected in parallel in each level offset count logic 802 by selecting all bits above the selected node and comparing with the node bit map for the respective level. Processing continues with step 906.

At step 906, each level adder 806 computes the offset based on the number of mapper entries up to the selected node in the level. Processing continues with step 908.

At step 908, adder 610 adds the total number of mapper entries from all levels stored in mapper memory for nodes up to the selected node to the block pointer to provide the mapper index 516 to the pointer for the selected node. Processing is complete.

At step 910, there is no mapper entry for the selected node. All the mapper entries for the level are added to provide the offset to the first mapper entry in the next level. Processing continues with step 908.

A lookup table including a subtree descriptor encoding a subtree using one bit per node requires less overall memory than the prior art subtree descriptor encoding a subtree using one bit per leaf node. The reduction in memory for an embodiment capable of storing 256K routes in mapper memory is shown below in Table 2.

TABLE 2

|  | Prior Art | New |
|---|---|---|
| Subtree memory | 32K × 256 bits = 8M bits | 32K × 294 bits = 9.1875M bits (practical 32K × 304 bits = 9.5 M bits) |
| Mapper memory | 512K × 21bits = 10.5M bits (practical size = 512K × 24 bits = 12 M bits) | 256K × 21 bits = 5.25M bits (practical size = 256K × 24 bits = 6 M bits) |
| Total memory | 18.5 M bits (practical size = 20M bits) | 14.4375 M bits (practical size = 15.5M bits) |

The number of bits per entry in subtree memory is increased from 256 bits to 294 bits. The 294 bit entry includes 256 bits of subtree data, a 20-bit default index and an 18-bit block pointer field. As shown in Table 2, the total memory is reduced from 20 Mega bits to 15 Mega bits.

The invention has been described for an embodiment in which the mapper address logic is implemented using decoders, adders and combinational logic (AND, NOR, OR gates). However, in an alternate embodiment, the mapper address logic can be implemented using a Content Addressable Memory (CAM) as is well known to those skilled in the art.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
   mapper storage to store pointers for nodes in a subtree;
   subtree descriptor information including bits corresponding to nodes in the subtree, a state of each bit in the subtree descriptor information indicating whether a pointer for a corresponding node in the subtree is stored in the mapper storage; and
   mapper address logic to receive an index value identifying a node in the subtree, the mapper address logic including a decoder to select bits in the subtree descriptor information as delineated by the index value, the mapper address logic including an adder to sum the bits selected by the decoder to calculate an offset to a pointer in the mapper storage.

2. The apparatus as in claim 1, wherein the bits selected by the decoder reside at a lower level of the subtree than a bit in the subtree corresponding to the index value.

3. The apparatus as in claim 1, wherein the subtree descriptor information includes at least one bit corresponding to a node beneath a root node of the subtree and above a leaf node of the subtree.

4. The apparatus as in claim 1, wherein the subtree descriptor information includes a respective bit for each of the nodes in the subtree.

5. The apparatus as in claim 4, wherein the decoder is a thermometer decoder; and
   wherein the thermometer decoder includes decoder circuitry for decoding each level of the subtree.

6. The apparatus as claimed in claim 1, wherein the decoder comprises:
   a binary decoder to receive the index value as input and to produce decoder output bits;
      a first array of gates, each gate of which operates on a corresponding decoder output bit from the binary decoder and a subtree bit from the subtree descriptor information; and
      a second array of gates, each gate of which operates on an output of one of the first array of gates and an output of an adjacent gate in the second array of gates to produce a decoder output.

7. The apparatus as in claim 6, wherein the decoder includes logic circuitry to modify the decoder output in response to detecting a condition in which the subtree bit indicates that there is no corresponding pointer in the mapper storage for the node identified by the index value.

8. An apparatus comprising:
   bitmap information representing a subtree of multiple nodes, the multiple nodes corresponding to routes on which to forward data in a network, the bitmap information including bit values indicating whether a node in the subtree has an associated route for routing of data, the bitmap information including a respective bit value for at least one node in the subtree between a root node of the subtree and a leaf node of the subtree;
   a storage resource to store route information associated with the multiple nodes present in the subtree; and
   mapper logic to receive an index value identifying a node in the subtree, the mapper logic configured to select, based on the index value, which portion of the bitmap information to process to identify a route in the stored route information on which to forward the data.

9. The apparatus as in claim 8, wherein the bitmap information includes a bit value for each of the multiple nodes in the subtree.

10. The apparatus as in claim 8, wherein the route information includes a respective forwarding route for a given node in the subtree, the given node being located at a level in the subtree beneath the root node and above the leaf node of the subtree.

11. The apparatus as in claim 10, wherein a state of a respective bit value for the given node in the subtree indicates that the given node in the subtree has a corresponding route in the route information on which to forward the data.

12. An apparatus comprising:
   bitmap information including bit values, the bit values indicating which nodes in a tree are nodes having associated routes for routing of data, the bitmap including at least one bit value corresponding to a node between a root node and a leaf node of the tree; and
   address mapper logic to: i) derive a count value based on a number of nodes in the tree having associated routes for routing of data, and ii) identify, based on the count value as an index, a route amongst the associated routes on which to forward the data.

13. A method comprising:
   storing bitmap information in a storage device, the bitmap information representing a tree, the tree including multiple nodes corresponding to routes on which to forward data in a network, the bitmap information including bit values indicating whether a node in the tree has an associated route for routing of data, the bitmap information including a respective bit value for at least one node in the tree that resides below a root node of the tree and above a leaf node of the tree;
   storing route information associated with the multiple nodes in the tree;
   receiving an index value identifying a node in the tree; and
   selecting, via use of the index value, which portion of the bitmap information to process to identify a route in the route information on which to forward the data.

14. The method as in claim 13, wherein the bitmap information includes a bit value for each of multiple nodes in the tree.

15. A method comprising:
   storing bitmap information in a storage device, the bitmap information representing a subtree, the subtree including multiple nodes corresponding to routes on which to forward data in a network, the bitmap information including bit values indicating whether a node in the subtree has an associated route for routing of data;
   storing route information associated with the multiple nodes in the subtree;
   receiving an index value identifying a node in the subtree; and
   generating, via use of the index value, a bit pattern delineating the portion of the bitmap information to produce an offset value, the offset value indicative of a route in the route information on which to forward the data.

16. The method as in claim 15, wherein the bitmap information includes a respective bit value for each node in the subtree.

17. The method as in claim 15 further comprising:
   processing the portion of the bitmap information to derive the offset value, the offset value representing a number of nodes in a respective portion of the subtree having corresponding routes in the route information.

18. The method as in claim 15 further comprising:
   utilizing a thermometer decoder to decode the index value and generate the bit pattern.

19. The method as in claim 15 further comprising:
   generating a count value indicating a number of nodes in the subtree beneath the index value that have a corresponding route in the route information; and
   utilizing the count value as the offset value, the offset value being used to select the route on which to forward data.

20. An apparatus comprising:
   mapper storage to store pointers for nodes in a tree;
   tree descriptor information including a bit for each node in the tree, a state of the bit for a corresponding node in the tree indicating whether a pointer for the corresponding node is stored in the mapper storage;
   mapper address logic including:
   input to receive an index value identifying a node in the tree;
   a decoder to select bits in the tree descriptor information depending on a setting of the index value; and
   an offset value generator to derive, based on the bits in the tree descriptor information selected by the decoder, an offset value to select a pointer in the mapper storage.

21. The apparatus as in claim 20, wherein the decoder is a thermometer decoder.

22. The apparatus as in claim 20, wherein the offset value generator includes adder circuitry to receive the bits selected by the decoder and produce the offset value.

23. The apparatus as in claim 20, wherein the bits selected by the decoder correspond to nodes in the tree beneath the node as specified by the index value.

24. The apparatus as in claim 23, wherein the offset value represents a summation of the nodes in the tree beneath the node, which is specified by the index value, that have a corresponding pointer in the mapper storage.

25. The apparatus as in claim 20, wherein each of the pointers specifies a corresponding route on which to forward data for a respective node in the tree.

* * * * *